United States Patent
Sugimoto (10) Patent No.: US 8,959,081 B2
(45) Date of Patent: Feb. 17, 2015

(54) CONTENT CREATION ASSIST DEVICE, CONTENT CREATION ASSIST METHOD, AND NON-TRANSITORY COMPUTER READABLE RECORDING MEDIUM STORING CONTENT CREATION ASSIST PROGRAM

(71) Applicant: Daisuke Sugimoto, Tokyo (JP)

(72) Inventor: Daisuke Sugimoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 169 days.

(21) Appl. No.: 13/834,387

(22) Filed: Mar. 15, 2013

(65) Prior Publication Data

US 2013/0246482 A1    Sep. 19, 2013

(30) Foreign Application Priority Data

Mar. 19, 2012 (JP) ................................ 2012-061443

(51) Int. Cl.
*G06F 7/00* (2006.01)
*G06F 17/30* (2006.01)

(52) U.S. Cl.
CPC ...... *G06F 17/30289* (2013.01); *G06F 17/3089* (2013.01)
USPC ......................................................... 707/721

(58) Field of Classification Search
USPC ......................................................... 707/721
See application file for complete search history.

(56) References Cited

FOREIGN PATENT DOCUMENTS

| JP | 11-144057 | 5/1999 |
|---|---|---|
| JP | 2002-150033 | 5/2002 |

OTHER PUBLICATIONS

U.S. Appl. No. 13/845,848, filed Mar. 18, 2013, Sugimoto.

*Primary Examiner* — Truong Vo
(74) *Attorney, Agent, or Firm* — Oblon, Spivak, McClelland, Maier & Neustadt, L.L.P.

(57) ABSTRACT

Disclosed is a content creation assist device including a product history database that associates and stores first designs and information regarding first requests for requesting to create the corresponding first design as product history information; a first input unit that receives a partial input of second request information for requesting to create a second design; a selection unit that selects plural samples products that have been produced in a past, based on the partially input second request information and the product history information; a second input unit that indicates the selected plural samples, and makes a user select one sample among the plural samples; and a request information supplement unit that sets remaining items of the partially input second request information by using the information regarding the first request corresponding to the selected sample.

5 Claims, 8 Drawing Sheets

FIG.3

| ITEM A | ITEM B | ITEM C | ITEM D | ITEM E | ITEM F |
|--------|--------|--------|--------|--------|--------|
| a1 | b1 | c1 | d1 | e1 | f1 |
| a2 | b2 | c2 | d2 | e2 | f2 |
| -  | b3 | c3 | d3 | e3 | f3 |
| -  | -  | c4 | -  | e4 | f4 |
| -  | -  | c5 | -  | -  | -  |

FIG.4

```
┌─────────────────────────────────────────────┐
│      REQUEST INFORMATION INPUT SCREEN       │
│    (OR PRODUCT INFORMATION INPUT SCREEN)    │
├─────────────────────────────────────────────┤
```

| | |
|---|---|
| PURPOSE: | SALES PROMOTION |
| OUTPUT PRODUCT: | LEAFLET |
| REQUIRED QUANTITY: | 100 |
| ATTACHMENT: | PLEASE DRAG AND DROP ATTACHMENT HERE |
| BUDGET: | 100 ~ 120 |
| DATE OF DELIVERY: | 2012/1/31 |
| PICKINESS ABOUT: | ☐ SPEED    ☐ PROVEN |

FIND DESIGNER

FIG.5

| PRODUCT HISTORY DATA ITEMS | ITEMS INPUT FOR SELECTING DESIGN PARTNER | CREATOR INFORMATION | ... |
|---|---|---|---|
| IMAGE 1 | (a1, b3, c2, d1, e1, f3) | DESIGN PARTNER X1 | ... |
| IMAGE 2 | (a2, b2, c2, d1, e4, f4) | DESIGN PARTNER X2 | ... |
| IMAGE 3 | ... | ... | ... |

CONTENT CREATION ASSIST DEVICE, CONTENT CREATION ASSIST METHOD, AND NON-TRANSITORY COMPUTER READABLE RECORDING MEDIUM STORING CONTENT CREATION ASSIST PROGRAM

BACKGROUND OF THE INVENTION

1. Field of the Invention

An embodiment of the present invention relates to a content creation assist device, a content creation assist method, and a non-transitory computer readable recording medium storing a content creation assist program. Especially, the embodiment of the present invention relates to assisting an input operation for requesting creation of a design to a designer by using a computer system.

2. Description of the Related Art

Recently, a concept of cloud computing has been proposed. The concept is considered to include a novel use case where a user utilizes an exact necessary amount of services and computer resources that reside in a virtual space over a network.

Meanwhile, in a technical field of publishing and commercial printing using computers, there is a process where a draft produced by a writer, a photographer, or an editor is finalized by a professional called a "designer." In order to maintain quality that meets the requirements of mass publication or commercial use, professional skills and knowledge are required in each of the processes. That is the reason why such specialization is necessary.

However, for a case where a small or medium sized company or a person who does not have sufficient financial resources to produce such a "professional document," it is not so easy to find professional human resources and/or professional companies. Accordingly, there are needs for a mediation system for producing "professional documents," which can be easily utilized by a small or medium sized company or a person who has little knowledge about the technical field of publishing and commercial printing using computers.

The reality is that, even if a customer is a large company, a printing company does not willingly undertake a printing job which is for a purpose of distributing a small number of documents to limited recipients. That is because it is difficult to provide the service at a price that corresponds to the cost.

The cloud computing is suitable for a use case where a necessary amount of services is used on demand. The cost may be reduced, if the cloud computing is utilized for such on-demand use of the service. A cloud computing based solution may be provided such that it efficiently finds professional resources and/or professional companies for a user who wishes to reduce the cost. In a field of designs of publications where communications with users are often required, particularly, provision of the cloud computing based solution is considered. The cloud computing base solution mediates between a user and a designer.

Patent Document 1 discloses a system for selecting a design and a designer. In the system, a competition is performed among plural designers based on data input by a user, and the user selects one design among the plural designs, thereby selecting the corresponding designer.

Patent Document 1: Japanese Unexamined Patent Publication No. 2002-150033

SUMMARY OF THE INVENTION

According to an aspect of the present invention, there is provided a content creation assist device including a product history database configured to associate first designs with information regarding first requests for requesting to create the corresponding first designs, and configured to store the first designs and the information regarding the first requests as product history information, wherein the first designs have been created by corresponding first design partners in a past, and the information regarding each of the first requests has been input at time of requesting to create the corresponding first design; a first input unit configured to receive a partial input of second request information for requesting a second design partner to create a second design; a selection unit configured to select plural samples of products that have been produced in the past, based on the partially input second request information and the product history information; a second input unit configured to indicate the selected plural samples to a user who partially inputs the second request information, and configured to make the user select one sample among the plural samples; and a request information supplement unit configured to set remaining items of the partially input second request information by using the information regarding the first request corresponding to the selected sample, wherein the information regarding the first request has been input at the time of requesting to create the first design of the selected sample.

According to another aspect of the present invention, there is provided a content creation assist method of a computer system including one or more computers. The computer system includes a product history database configured to associate first designs with information regarding first requests for requesting to create the corresponding first designs, and configured to store the first designs and the information regarding the first requests as product history information, wherein the first designs have been created by corresponding first design partners in a past, and the information regarding each of the first requests has been input at time of requesting to create the corresponding first design. The method includes a first input process of receiving a partial input of second request information for requesting a second design partner to create a second design; a selection step of selecting plural samples of products that have been produced in the past, based on the partially input second request information and the product history information; a second input step of indicating the selected plural samples to a user who partially inputs the second request information, and making the user select one sample among the plural samples; and a request information supplement step of setting remaining items of the partially input second request information by using the information regarding the first request corresponding to the selected sample, wherein the information regarding the first request has been input at the time of requesting to create the first design of the selected sample.

According to another aspect of the present invention, there is provided a non-transitory computer readable recording medium storing a content creation assist program of a computer system. The computer system includes a product history database configured to associate first designs with information regarding first requests for requesting to create the corresponding first designs, and configured to store the first designs and the information regarding the first requests as product history information, wherein the first designs have been created by corresponding first design partners in a past, and the information regarding each of the first requests has been input at time of requesting to create the corresponding first design. The content creation assist program causes the computer system to execute a method including a first input process of receiving a partial input of second request information for requesting a second design partner to create a second design; a selection step of selecting plural samples of products that have been produced in the past, based on the partially input second request information and the product history information; a second input step of indicating the selected plural samples to a user who partially inputs the second request information, and making the user select one sample among the plural samples; and a request information supplement step of setting remaining items of the partially input second request information by using the information regarding the first request corresponding to the selected sample, wherein the information regarding the first request has been input at the time of requesting to create the first design of the selected sample.

According to the embodiments of the present invention, there are provided the content creation assist device, the content creation assist method, and the non-transitory computer readable recording medium storing the content creation assist program which can convey the requirements of the product to be produced, through the intuitive input process.

Other objects, features and advantages of the present invention will become more apparent from the following detailed description when read in conjunction with the accompanying drawings.

DETAILED DESCRIPTION OF THE PREFERRED EMBODIMENTS

For ordering or requesting a job in the field of designing for publishing or commercial printing using computers, a user may be required to specify needs and to express the specified needs in a request for creation. Unfortunately, in a system disclosed in Patent Document 1, for example, input items of the request for creation are set in advance by a system operator. For a case where the user does not understand well the meaning and importance of the items that are set in advance, the user may not express the requirements of a product very well, and a desired result may not be obtained. In a system according to related art, attribute information such as achievements, owned facilities, and award-winning history are defined as the information regarding the needs. These items are not the items which can be intuitively selected by the user.

When the user does not understand how to utilize the pieces of information which are provided as selection items that can be input (including, for example, a case where an achievement is for a different category that is not related to a category of a product to be produced, which is desired by the user, and a case where the user does not understand importance of an award), even if the user has some requirements, the user may not express the requirements by the selection items. When the technology according to related art is applied to a cloud computing based solution being considered in the present application that mediates between the user and the designer, a result may not be obtained which satisfies the requirements of the user.

For ordering or requesting a job in the field of designing for publishing or commercial printing using computers, for which an average user has little knowledge, it is possible that selection items which can be input in a purchase order or an application form do not relate to requirements of a product, the production of which is requested by the user.

An embodiment of the present invention has been developed in view of the above-described circumstance. There is a need for a content creation assist device, a content creation assist method, and a non-transitory computer readable recording medium storing a content creation assist program, which can convey requirements of a product to be produced to a designer through an intuitive input process.

The embodiment of the present invention is explained by referring to the accompanying drawings.

[System Configuration]

Figure 1:
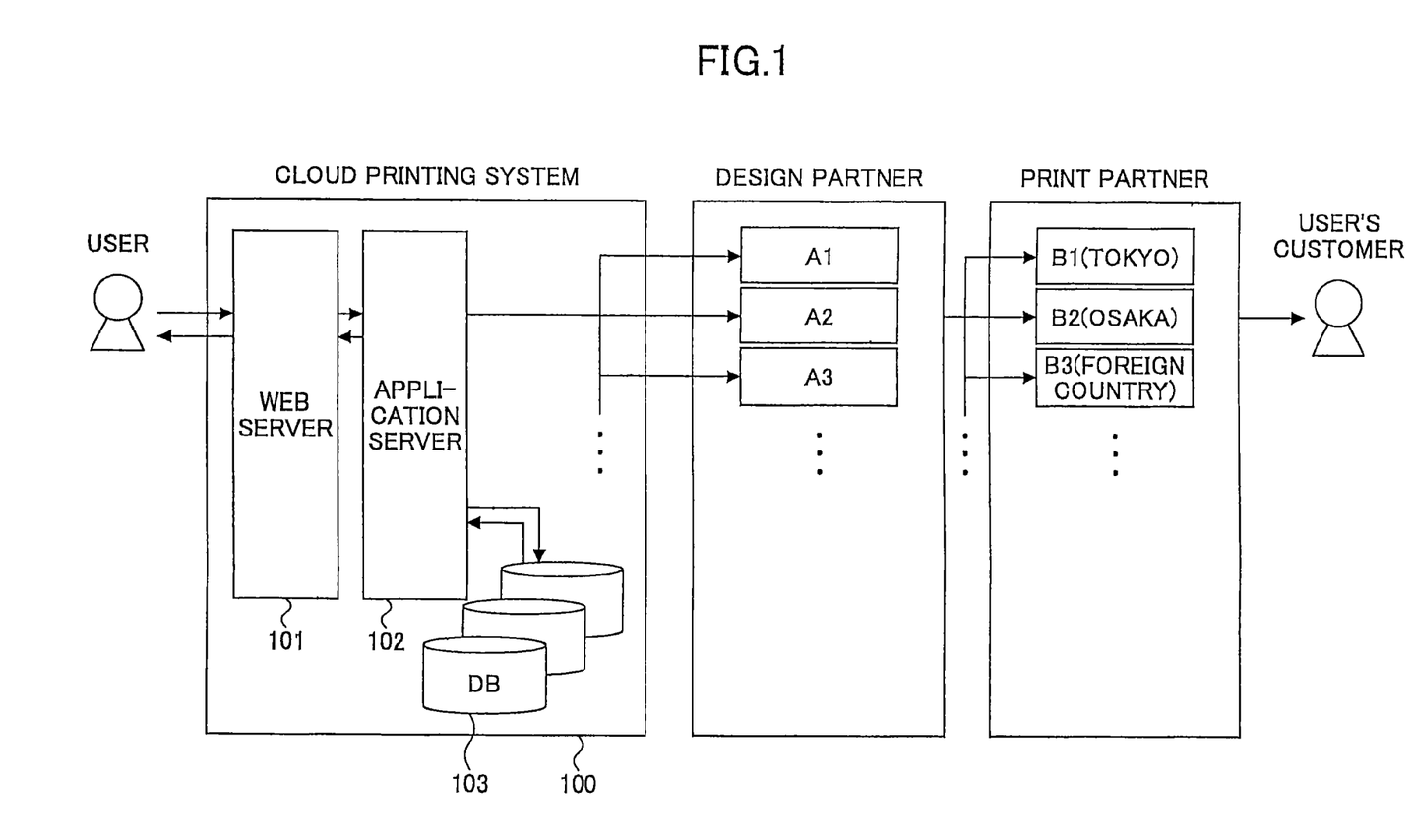
FIG. 1 is a diagram showing an example of a network configuration according to an embodiment.

FIG. 1 shows a schematic configuration of a network according to an embodiment, which is viewed from an infrastructure layer. As shown in FIG. 1, a cloud printing system 100 according to the embodiment intervenes between a user, which is an operator, and a customer of the user. The cloud printing system 100 is a computer system which mainly supports and assists communications between a client and the customer regarding a printed product as a medium. Further, until completion of delivery of the printed product to the customer, the cloud printing system 100 assists utilization of professional human resources, such as a design partner or a print partner, and utilization of equipment.

However, the present invention explained by the embodiment is not limited to creation of printed products. The present invention can be applied generally to the creation of contents.

According to the embodiment, the cloud printing system 100 particularly assists selection of a design partner by the client. The cloud printing system 100 includes, at least, a web server 101; an application server 102; and a database 103. The web server 101 may be a well-known general purpose web server. The web server 101 interactively performs input of information to and output of information from the client device operated by the user, thereby enabling utilization of services provided by the application server 102.

The application server 102 accesses the database 103. The database 103 is a storage which stores information regarding design partners and information regarding past products produced by the corresponding design partners. The application server 102 can also access a storage that is used for selecting the design partner and for storing data of the printed product produced after the selection.

The infrastructure shown in FIG. 1 is an example where the cloud printing system 100 is implemented as a web application. As a configuration where the cloud printing system 100 is not implemented as a web application, an example may be considered where an application software dedicated for utilizing the cloud printing system 100 is installed on the client device which is operated by the user, and the application software interactively performs the input of the information to and the output of the information from the application server 102.

The application server 102 is designed so that the application server 102 can exchange information with a design partner or a print partner who establishes connection with the cloud printing system 100. Here, the "design partner" is a so-called "designer" or a person being engaged in the business of design, who undertakes creation of a user's desired printed matter. The design partner concludes a partner contract with an administrating company of the cloud printing system 100. The "print partner" is a printing company who undertakes printing of a user's desired printed matter.

Figure 2:
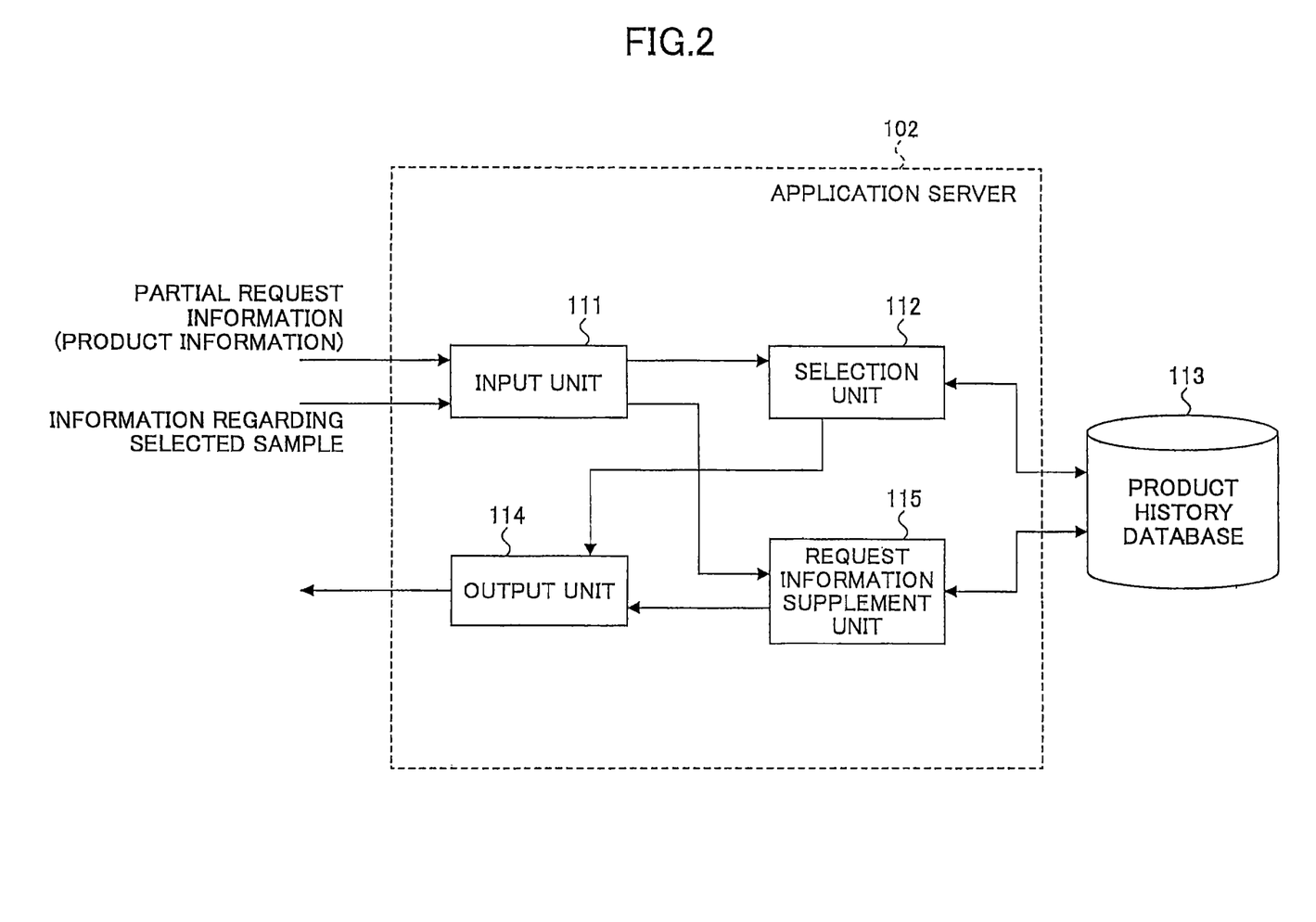
FIG. 2 is a block diagram showing a functional configuration of an application server of FIG. 1.

FIG. 2 shows a functional configuration of the application server 102 of FIG. 1. As shown in the figure, when the application server 102 is viewed from a functional viewpoint, the application server 102 includes an input unit 111; a selection unit 112; an output unit 114; and a request information supplement unit 115. The product history database 113 included in the database 103 is connected to the application server 102, so that the product history database 113 and the application server 102 can communicate with each other.

The input unit 111 and the output unit 114 are units for exchanging information between the web server 101 and the application server 102. The input unit 111 inputs information to the application server 102. The information to be input includes, at least, request information (which may be a part of request information) regarding creation of a design and information regarding a sample. Here, the creation of the design is requested to a design partner by the user. The sample is a sample which is selected by the user when the sample is indicated to the user.

Figure 3:
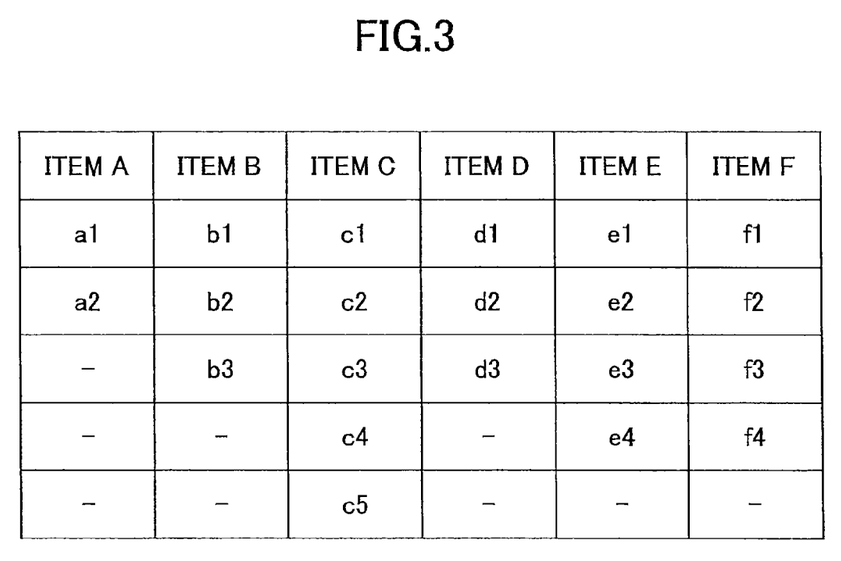
FIG. 3 is a diagram showing an example of items of product information in the embodiment.

In the embodiment, the request information regarding the creation of the design (which may be a part of the request information), which is requested to the design partner by the user, is referred to as the "product information." FIG. 3 shows an example of items of the product information. Since the product information is maintained by a table such as shown in FIG. 3, the user selects items in such a way that an item is selected from the two items of "a1" and "a2" regarding the item A, and an item is selected from the three items of "b1," "b2," and "b3" regarding the item B, etc.

Figure 4:
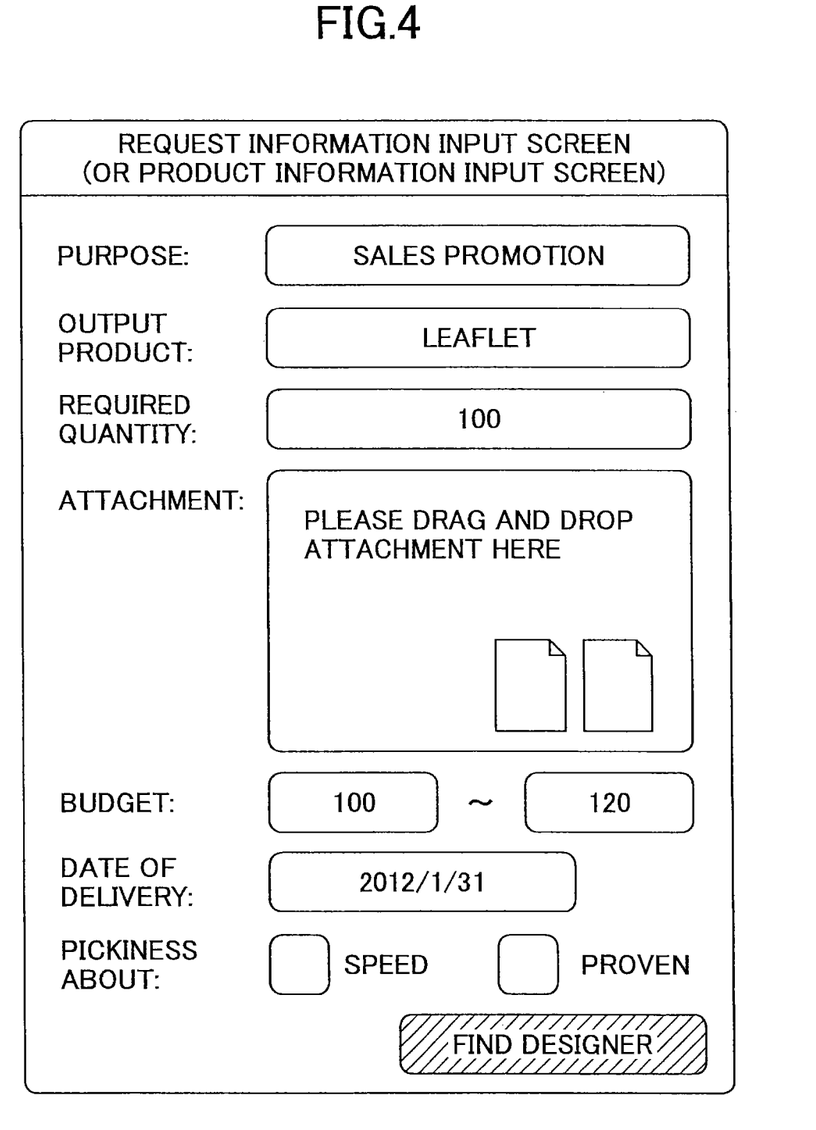
FIG. 4 is a diagram showing an example of a user interface for inputting the product information according to the embodiment.

FIG. 4 shows an example of a user interface for a user to input such product information. Here, it is not necessary that all the input fields shown in FIG. 4 be associated with the items shown in FIG. 3.

The output unit 114 outputs information from the application server 102. The information to be output includes, at least, information regarding plural samples, which are selected based on the product information. A mode of outputting the information regarding the plural samples may be such that a user interface for displaying the plural samples to the user is displayed, and thereby enabling the user to choose one of the samples among the plural samples.

The selection unit 112 selects a sample to be indicated to the user based on the product information and the product history information. The product history database 113 stores the product history information. The sample to be indicated to the user is the sample of the product which was produced in the past. The sample to be indicated to the user may be plural samples.

During a selection process, the selection unit 112 selects some past products by referring to partially input request information (namely, the product information) and the product history information obtained by referring to the product history database 113. The selection unit 112 selects the past products, whose degrees of coincidence between the product information and the product history information are large. For example, the selection unit 112 selects plural products, such as the first product to the fifth or the sixth product in the descending order of the degree of coincidence. The product history database 113 is a database that maintains information regarding a past work, which has been stored since the creation of the product requested in the past was completed. In the embodiment, this information is used for the subsequent selection.

Figure 5:
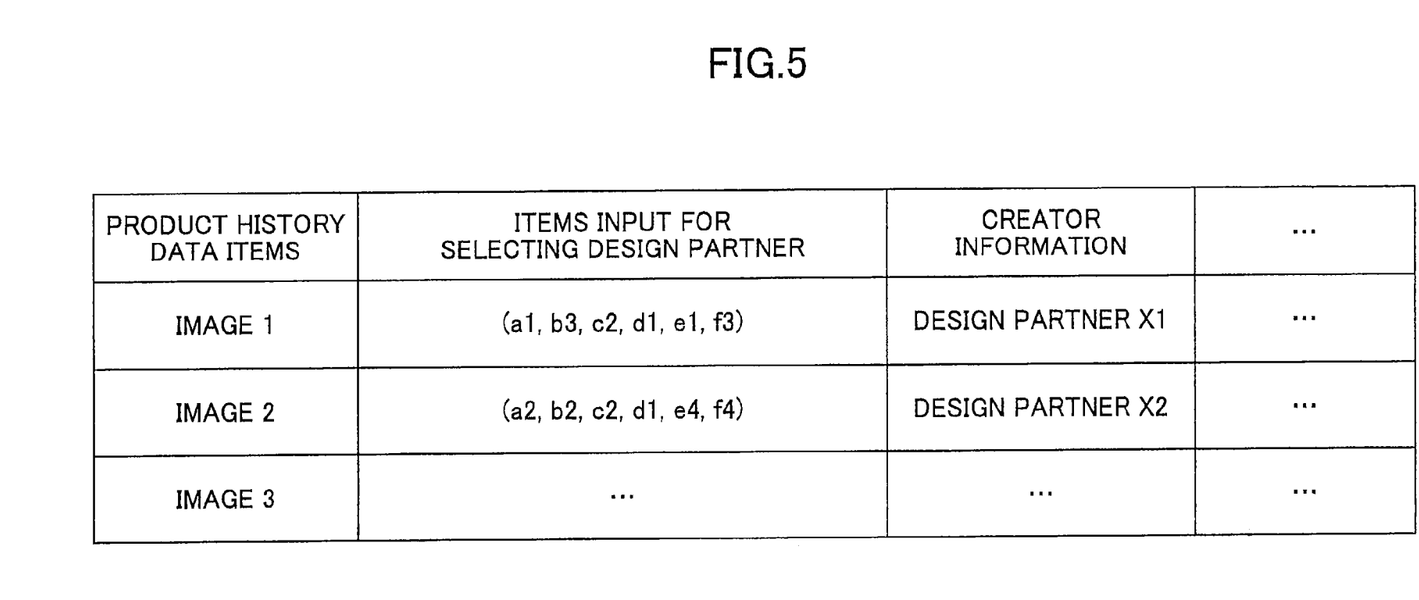
FIG. 5 is a diagram showing a producing history information table stored in a product history database.

FIG. 5 shows an example of the product history information table stored in the product history database 113. As shown in FIG. 5, for each of product history data items, the items input for selecting the design partner and the information regarding the selected design partner are associated with each other and stored. The image data pieces of the corresponding product history data items are used as the samples.

When the information regarding the samples selected by the input unit 111 is received, the request information supplement unit 115 retrieves the request information corresponding to the selected samples, which were input for requesting the creation of the corresponding designs, by referring to the product history database 113. Further, the request information supplement unit 115 sets the remaining items of the partially input request information (namely, the product information) using the retrieved request information.

Subsequent to the setting of the remaining input items of the request information, the request information supplement unit 115 transmits the supplemented product information, as the request information, to the design partners corresponding to the selected samples. The design partners corresponding to the selected samples are the design partners which created the corresponding selected samples in the past. The information regarding the design partners corresponding to the selected samples can be retrieved by referring to the product history database 113.

[Information Processing]

First, the timing of performing input assistance by the above-described functional configurations is explained. Next, information processing for achieving the input assistance is explained.

Figure 6A:
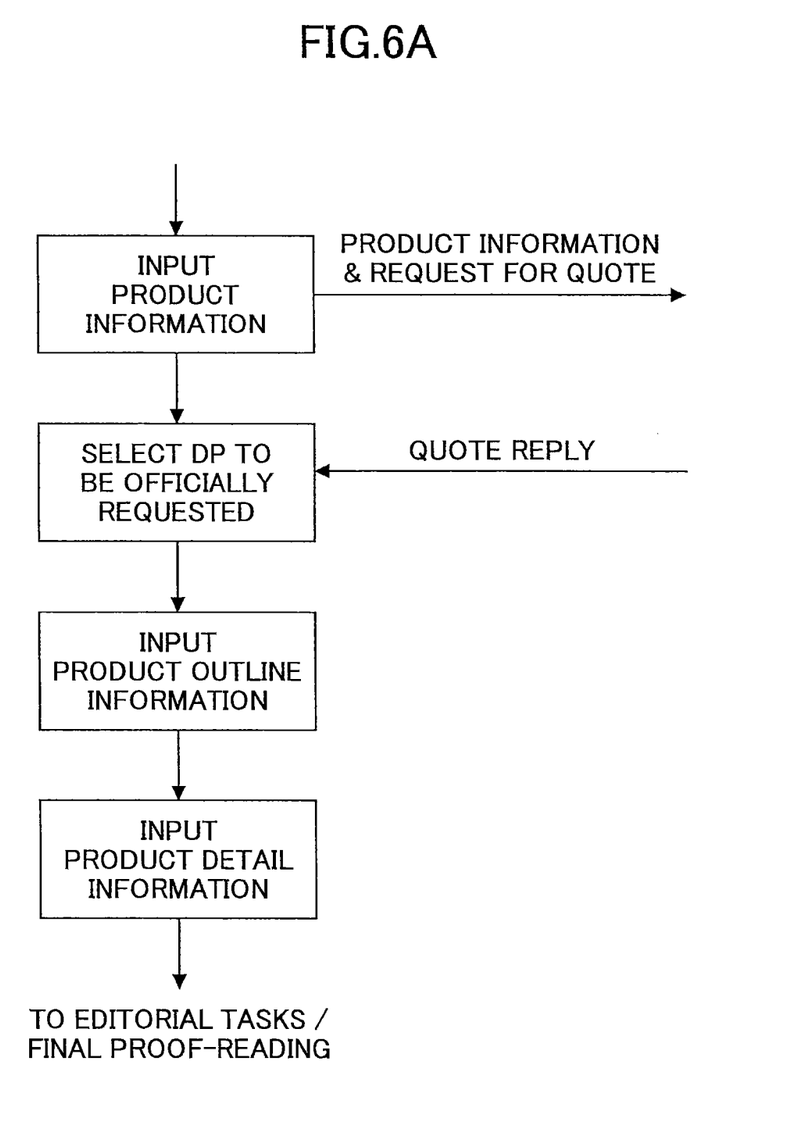
FIG. 6A is a flowchart showing an example of an operation flow of design creation.
Figure 6B:
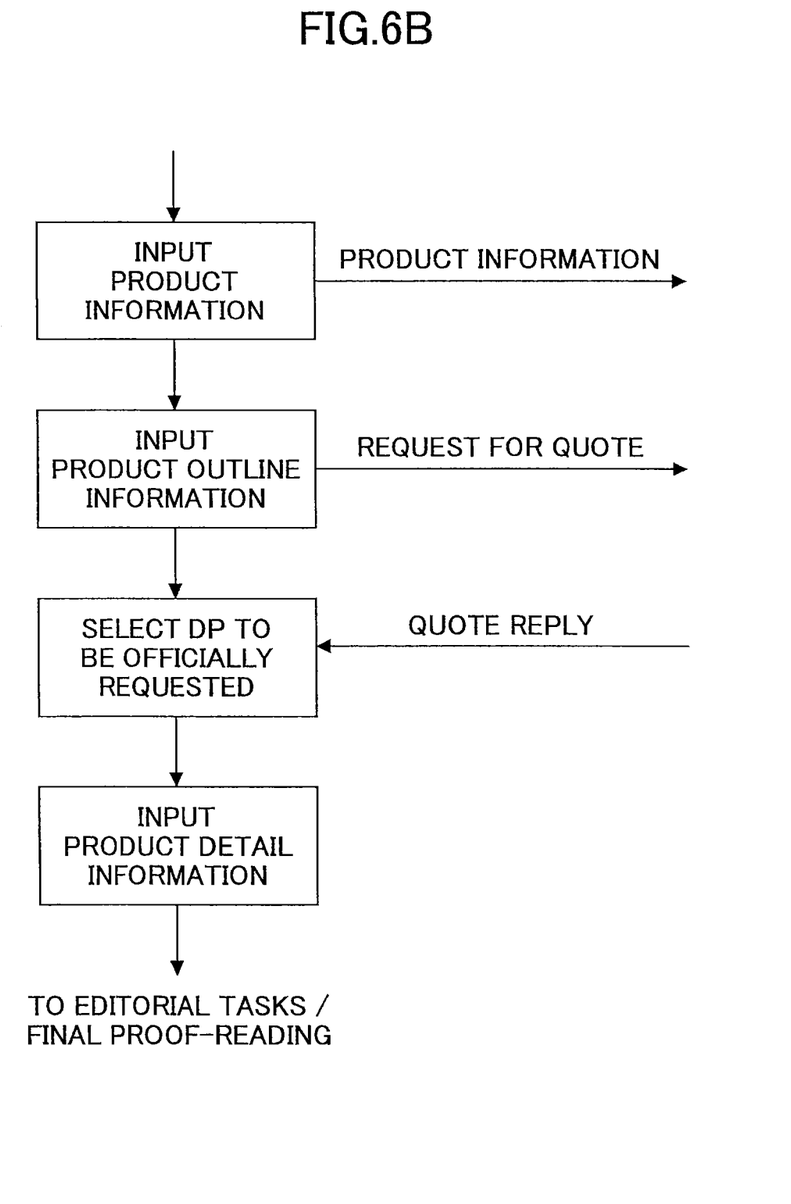
FIG. 6B is a flowchart showing an example of an operation flow of the design creation.

FIGS. 6A and 6B show examples of operation flows of the design creation using the cloud printing system 100 of FIG. 1. There are no limitations regarding the timing of performing the input assistance according to the embodiment by the cloud printing system 100 shown in FIG. 1. As shown in FIG. 6A, when the product information and the request for a quote are simultaneously input, the input assistance is used for inputting the product information.

Alternatively, as shown in FIG. 6B, when the cloud side narrows down suitable design partners to a certain extent in response to the input of the product information by the user, and subsequently the user inputs the outline information regarding the product, which is detailed enough for requesting a quote, the input assistance is used for inputting the product information. Additionally, the input assistance according to the embodiment may be applied to inputting the outline information regarding the product.

Figure 7:
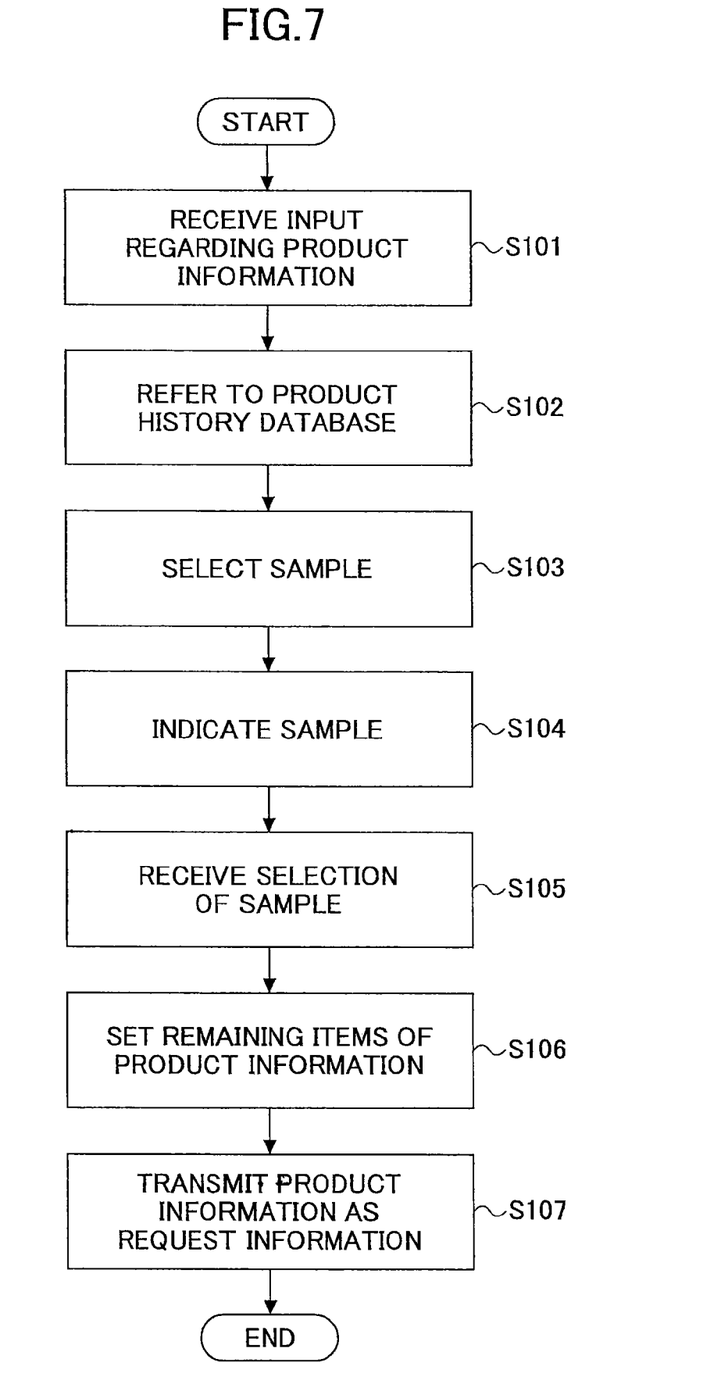
FIG. 7 is a flowchart showing an information processing procedure of input assistance by the functional configuration of FIG. 2.

FIG. 7 shows an information processing procedure of the input assistance by the functional configuration of the application server 102. During the information processing of the input assistance, the application server 102 receives an input regarding the product information at any time (S101).

When the product information (the request information for the user to request creation of the design to the design partners (which can be the partial request information)) is input, the application server 102 refers to the product history database 113 (S102).

Subsequently, the samples are selected from the first sample to the fifth or the sixth sample in accordance with the descending order of the degree of the coincidence, based on the input items which are partially input (S103). Then, the selected samples are output, and the selected samples are indicated to the user (S104).

The application server 102 waits for an input for selecting one of the samples among the plural output samples. When the input for selecting the sample is received (S105), the remaining items are set based on "the items which were input for selecting the design partner." The items are associated with the selected sample. In this manner, the input information is supplemented (S106).

Subsequently, the supplemented product information is transmitted to the design partner who is associated with the selected sample (S107). In the embodiment, by performing the above described information processing, the user can transmit the requirements of the product, creation of which is requested by the user, to the designer through the intuitive input. Additionally, the information processing procedure of the input assistance by the functional configuration of the application server 102, which is shown in FIG. 7, may be performed by a computer by providing a computer readable recording medium storing a program that causes the computer to perform the information processing procedure of the input assistance, and by installing the program to the computer.

With a technique according to related art, it is possible that selection items are not related to requirements of a product, creation of which is requested by a user. Whereas, according to the embodiment, the application server 102 displays the product history data items (the sample images) as preview images by referring to the history information maintained in the product history database 113. When the user selects an image, the items associated with the image are automatically input, thereby enabling intuitive inputting of the items by the user based on the desired image.

If such an input assistance were not utilized, the user would not discern the degree of coincidence or disagreement between a product to be produced based on items input by the user and requirements of the product held by the user. In the embodiment, in order for the user to confirm the degree of coincidence or disagreement between the product to be produced and the requirements of the product, past products, which are close to the currently input items, are extracted from the product history database 113, and the images of the extracted past products are displayed as preview images.

Accordingly, the user can find some requirements of a product to be obtained based on the input items selected by the user. Thus, the user is provided with information for making a decision as to whether the user's selection is correct or not, and thereby the user's satisfaction can be improved.

Hereinabove, the content creation assist device, the content creation assist method, and the non-transitory computer readable recording medium storing content creation assist program are explained by the embodiment. However, the present invention is not limited to the above-described embodiment, and various modifications and improvements may be made within the scope of the present invention. For the convenience of explanation, the devices according to the embodiment of the present invention are explained by using functional block diagrams. However, these devices may be implemented in hardware, software, or combinations thereof. The software may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, and the like.

The present application is based on Japanese Priority Application No. 2012-061443 filed on Mar. 19, 2012, the entire contents of which are hereby incorporated herein by reference.

What is claimed is:

1. A content creation assist device comprising:
a product history database configured to associate first designs with information regarding first requests for requesting to create the corresponding first designs, and configured to store the first designs and the information regarding the first requests as product history information, wherein the first designs have been created by corresponding first design partners in a past, and the information regarding each of the first requests has been input at time of requesting to create the corresponding first design;
a first input unit configured to receive a partial input of second request information for requesting a second design partner to create a second design;
a selection unit configured to select plural samples of products that have been produced in the past, based on the partially input second request information and the product history information;
a second input unit configured to indicate the selected plural samples to a user who partially inputs the second request information, and configured to make the user select one sample among the plural samples; and
a request information supplement unit configured to set remaining items of the partially input second request information by using the information regarding the first request corresponding to the selected sample, wherein the information regarding the first request has been input at the time of requesting to create the first design of the selected sample.

2. The content creation assist device according to claim 1, wherein, subsequent to the setting of the remaining items of the partially input second request information, the request information supplement unit transmits the second request information to the first design partner corresponding to the selected sample, wherein the first design partner has created the first design of the selected sample in the past.

3. The content creation assist device according to claim 1, wherein the selection unit selects the samples based on the partially input second request information and the product history information, so that degrees of coincidence between the products corresponding to the selected samples and input item information of the partially input second request information are maximized.

4. A content creation assist method of a computer system including one or more computers, the computer system including a product history database configured to associate first designs with information regarding first requests for requesting to create the corresponding first designs, and configured to store the first designs and the information regarding the first requests as product history information, wherein the first designs have been created by corresponding first design partners in a past, and the information regarding each of the first requests has been input at time of requesting to create the corresponding first design;
the method comprising:
a first input process of receiving a partial input of second request information for requesting a second design partner to create a second design;

a selection step of selecting plural samples of products that have been produced in the past, based on the partially input second request information and the product history information;

a second input step of indicating the selected plural samples to a user who partially inputs the second request information, and making the user select one sample among the plural samples; and a request information supplement step of setting remaining items of the partially input second request information by using the information regarding the first request corresponding to the selected sample, wherein the information regarding the first request has been input at the time of requesting to create the first design of the selected sample.

5. A non-transitory computer readable recording medium storing a content creation assist program of a computer system including a product history database configured to associate first designs with information regarding first requests for requesting to create the corresponding first designs, and configured to store the first designs and the information regarding the first requests as product history information, wherein the first designs have been created by corresponding first design partners in a past, and the information regarding each of the first requests has been input at time of requesting to create the corresponding first design;

wherein the content creation assist program causes the computer system to execute a method comprising:

a first input process of receiving a partial input of second request information for requesting a second design partner to create a second design;

a selection step of selecting plural samples of products that have been produced in the past, based on the partially input second request information and the product history information;

a second input step of indicating the selected plural samples to a user who partially inputs the second request information, and making the user select one sample among the plural samples; and a request information supplement step of setting remaining items of the partially input second request information by using the information regarding the first request corresponding to the selected sample, wherein the information regarding the first request has been input at the time of requesting to create the first design of the selected sample.

* * * * *